United States Patent
Barthelme et al.

(10) Patent No.: US 9,835,203 B2
(45) Date of Patent: Dec. 5, 2017

(54) ROLLING BEARING ARRANGEMENT (71) Applicants: Jürgen Barthelme, Frankenwinheim (DE); Alexander Dilje, Schweinfurt (DE); Helmut Hauck, Euerbach (DE); Daniel Ludwig, Gochsheim (DE); Stefanie Seufert, Rothhausen (DE)

(72) Inventors: Jürgen Barthelme, Frankenwinheim (DE); Alexander Dilje, Schweinfurt (DE); Helmut Hauck, Euerbach (DE); Daniel Ludwig, Gochsheim (DE); Stefanie Seufert, Rothhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/135,995

(22) Filed: Apr. 22, 2016

(65) Prior Publication Data
US 2017/0130775 A1    May 11, 2017

(30) Foreign Application Priority Data

Apr. 24, 2015 (DE) .................. 10 2015 207 523

(51) Int. Cl.
*F16C 35/067* (2006.01)
*F16C 35/06* (2006.01)
(Continued)

(52) U.S. Cl.
CPC .............. *F16C 35/06* (2013.01); *F16C 19/06* (2013.01); *F16C 33/58* (2013.01); *F16C 33/76* (2013.01);
(Continued)

(58) Field of Classification Search
CPC ................ F16C 35/06; F16C 33/783–33/7866
See application file for complete search history.

(56) References Cited

U.S. PATENT DOCUMENTS 4,236,767 A * 12/1980 Feldle .................... F16C 25/08
384/488
5,641,239 A * 6/1997 Michalek ............... F16C 33/60
384/499
(Continued)

FOREIGN PATENT DOCUMENTS

DE     10347361 A1   5/2005
DE     10355407 B3   5/2005
(Continued)

*Primary Examiner* — Thomas R Hannon
(74) *Attorney, Agent, or Firm* — Bryan Peckjian; SKF USA Inc. Patent Dept.

(57) ABSTRACT

A bearing arrangement is disclosed having a bearing and a bearing support. The bearing is coupled to the bearing support at an axial side. The bearing provides first and second bearing rings that define a bearing interior there between. A first groove is formed at the first bearing ring's radial side facing the second bearing ring. A coupling element is arranged at the bearing's axial side facing the bearing support. The coupling element includes a first, preferably nose-shaped, radial protrusion that is in engagement with the first groove, and a second radial protrusion, which at least partially encompasses the bearing support at a side facing away from the bearing, so that the coupling element fastens the bearing to the bearing support. A coupling element for such a bearing arrangement is also provided.

10 Claims, 7 Drawing Sheets

(51) Int. Cl.
*F16C 33/76* (2006.01)
*F16C 33/78* (2006.01)
*F16C 19/06* (2006.01)
*F16C 33/58* (2006.01)

(52) U.S. Cl.
CPC ........ *F16C 33/785* (2013.01); *F16C 33/7853* (2013.01); *F16C 35/067* (2013.01); *F16C 2220/04* (2013.01); *F16C 2226/60* (2013.01); *F16C 2226/74* (2013.01); *F16C 2361/61* (2013.01)

(56) References Cited

U.S. PATENT DOCUMENTS

| | | | | |
|---|---|---|---|---|
| 6,007,253 | A * | 12/1999 | Rutter | F16C 19/184 384/539 |
| 7,374,345 | B2 * | 5/2008 | Ilie | F16C 33/7886 384/537 |
| 7,927,021 | B2 * | 4/2011 | Schumacher | F16C 19/184 384/537 |
| 8,668,392 | B2 * | 3/2014 | Maldera | F16C 33/7883 384/542 |
| 2003/0099419 | A1 * | 5/2003 | Vignotto | F16C 19/184 384/539 |

FOREIGN PATENT DOCUMENTS

| | | | |
|---|---|---|---|
| DE | 10355363 B4 | 9/2005 | |
| WO | 2008/151885 A2 | 12/2008 | |
| WO | WO 2015043629 A1 * | 4/2015 | .......... F16C 33/7846 |

* cited by examiner

ROLLING BEARING ARRANGEMENT

CROSS-REFERENCE TO RELATED APPLICATIONS

This application claims priority to German patent application no. 102015207523.0 filed on Apr. 14, 2015, the contents of which are fully incorporated herein by reference.

TECHNICAL FIELD

The present invention relates to a bearing arrangement comprising a bearing and a bearing support according to the preamble of claim 1.

BACKGROUND OF THE INVENTION

Generic bearing arrangements are known, for example, from the DE 10355363. This document describes a bearing arrangement comprising a bearing and a bearing support, wherein at least two molded plastic parts are arranged at the bearing support, which engage with a groove-shaped recess at the bearing ring, so that the bearing and the bearing support are axially and radially fastened relative to each other. Thereby, the groove-shaped recess comprises at least partially an undercut in axial direction, which ensures a fastening of the molded plastic parts. The molded plastic parts themselves are formed as separate parts, which are formed in corresponding recesses at the bearing support using injection-molding.

However, a disadvantage of this prior art is, that the groove-shaped recesses have to be deliberately lathed into the bearing ring, and that the bearing supports have to be subjected to injection-molding for enabling a coupling between the bearing and the bearing ring. Thus, the manufacturing of such hearings and bearing supports is very labor intensive and cost intensive.

SUMMARY OF THE INVENTION

It is therefore object of the present invention to provide a bearing arrangement, wherein a coupling of the bearing to a supporting bearing support is particularly easy to manufacture.

In the following a bearing arrangement is presented, which comprises at least one bearing and one bearing support, wherein the bearing is coupled to the bearing support at an axial side. The bearing further comprises first and second bearing rings, wherein a first groove is arranged at the first bearing ring at a radial side facing the second bearing ring. Preferably, said groove may be a sealing groove of a standard bearing.

For providing an easy coupling between the bearing support and the bearing, a coupling element is arranged at the bearing's axial side facing the bearing support, wherein the coupling element comprises a first protrusion, which is in engagement with the first groove. Preferably, said first protrusion is formed nose-shaped. Furthermore, the coupling element comprises a second protrusion, which at least partially encompasses the bearing support at a side of the bearing support facing away from the bearing, so that the bearing is attachable to the bearing support. Thereby, a bearing arrangement may be provided, wherein a standard bearing is attachable to the bearing support in a simple manner by means of the already existing grooves included in the standard bearing. This in turn allows for a significant cost reduction, since the bearings used in the bearing arrangement do not have to be manufactured deliberately. In addition, the configuration of the coupling element allows for the bearing support to be already coupled to the bearing throughout the mounting of the bearing. Furthermore, the bearing support itself does not have to be machined deliberately for forming a coupling option for the bearing at the bearing support, as known from the prior art.

According to a preferred embodiment, the coupling element is designed for arranging a radial clearance between the at least one bearing and the bearing support. This radial clearance allows for the compensation of tensions between the bearing and the bearing support, wherein tensions may occur, for example, by different thermal expansions of the bearing support and of the hearing. This may be important, if, for example, a spatially stationary shaft shall be supported in a housing, e.g. as a car gear-box, by means of the bearing. If the bearing support is stationarily mounted, the radial clearance, allows for a tolerance compensating minor radial deviations in the location of the shaft. This is advantageous for multiple bearings arranged at a bearing support. in addition, this radial clearance may serve for a compensation of possible manufacturing tolerances during mounting of the bearing arrangement into an intended application. Thereby, a radial clearance in the range of about 0.01 to approx. 1 mm is especially preferred.

Preferably, the coupling element further comprises a radial extension, which extends substantially in the radial direction of the second bearing ring. Thereby, a bearing arrangement comprising a bearing having a sealed bearing interior may be formed in a simple manner. Furthermore, the hearing may be supplied with a lubricant via the sealing option and, thus, may be protected against the ingress of contaminations. Consequently, on the one hand, a particularly simple coupling between the bearing support and the bearing element may be provided by means of this sealing coupling element, wherein an additional handling of the bearing support may be omitted, and, at the same time, the bearing may be protected against the ingress of contaminations and against the leakage of lubricant, respectively.

According to a further preferred embodiment, for providing a good sealing, a sealing profile, in particular a sealing lip, may be arranged at the radial extension of the coupling element, wherein the sealing profile extends in the direction of the second bearing ring. Thereby, the radial extension may be formed as gap-type seal, i.e. a gap remains between the sealing profile and the bearing ring, or the radial extension may be fittingly designed, so that the sealing profile of the coupling element sealingly bears against the second bearing ring.

It is further advantageous, if the first and/or the second protrusion is designed as separate protrusion elements, which are distributed over the circumference. Thereby, the coupling element may be easily attached to the bearing support. It is further advantageous, if the second radial protrusion is formed as a spring element and/or as a snapping element. This allows for a simple coupling between the bearing and the bearing support. For enabling a good radial resp. circumferential mounting of the bearing at the bearing support, the bearing support may additionally comprise, preferably separate, recesses, with which the radial protrusion, particularly the separate radial protrusion elements, engage. in contrast, the first radial protrusion is preferably formed as ring element, so that a continuous covering of the bearing interior is created.

According to a further preferred embodiment, an undercut may be formed at the first groove. In this case, the first protrusion preferably comprises a complementarily formed nose, which engages with the undercut. Thereby, a sound coupling between the bearing and the bearing support may be provided. In addition, this undercut and/or the first protrusion may be formed at discrete locations, so that the radial position resp. the circumferential position of the bearing are fastened to the bearing support.

According to a further preferred embodiment, the coupling element comprises at least a first coupling element portion and a second coupling element portion, wherein the first coupling element portion comprises the first radial extension, and is therefore designed preferable as sealing element for sealing of the bearing. The second coupling element portion comprises the second radial protrusion, and is designed as holding element, which fastens the bearing to the bearing support.

Such a two-part design allows for the holding element being made from a relatively stiff material, e.g. metal or a sturdy plastic material, whereas the sealing element may be made from a softer plastic material, which nestles against the surfaces to be sealed.

Preferably, the sealing element may comprise at least one receiving pocket, in which the holding element is received. Thereby, an easy assembling of the sealing element and the holding element may be provided, since the holding element may be easily inserted into the receiving pocket of the sealing element. Alternatively, the holding element may be injection-molded or molded by a plastic material and/or an elastomeric material, which then forms the sealing element.

According to a further preferred embodiment, the sealing element sealingly extends from the first bearing ring to the second bearing ring, wherein a sealing profile, in particular a sealing lip resp. a sealing edge, is formed at the sealing element at least at the side facing the second bearing ring. As described above, said sealing profile may extend to the second bearing ring, so that the sealing element sealingly bears against the second bearing ring. However, it is also possible to design the sealing element and the sealing lip, respectively, as a gap-type seal. It goes without saying that such a sealing lip may also be arranged at the sides of the first bearing ring, so that the sealing element exerts its sealing function on the first as well as on the second bearing ring. Thereby, a particularly good sealing of the bearing interior may be provided.

According to a further preferred embodiment, the sealing element is received in the first groove and extends radially from the first groove towards the second bearing ring. In such an embodiment it is preferred, that the sealing element is made from a relative rigid material, so that a secure engagement of the sealing element with the groove is possible.

Alternatively, the holding element may be received in the first groove, which allows for a stable mounting of the coupling element to the groove and to the bearing support.

According to a further preferred embodiment, the bearing further comprises a further sealing element on a side facing away from bearing support, wherein the further sealing element is attached to a second groove, which is axially spaced apart from the first groove, wherein the second groove is also arranged at a radial side of the first bearing ring facing the second bearing ring, and extends radially toward the second bearing ring, wherein the further sealing element preferably comprises at its side a sealing profile, particularly a sealing lip. This sealing element may also comprise a sealing lip, which abuts against the second bearing ring, or may be designed as gap-type seal. Thereby, the bearing may not only be sealed at the sides of the bearing support, but the whole bearing interior may be sealed.

Other sealings may be used, which are known to the skilled person, and which are not explicitly mentioned here. For both, the sealing element at the side of the bearing support and the sealing element at the side facing away from the bearing support it is technically conceivable having a sealing lip with no immediate, direct contact to the facing bearing ring, but which merely fulfils the function of a gap-type seal. Furthermore, for the previously mentioned sealing elements it is possible, that their respective sealing lip resp. sealing profile and/or their respective holding element is not arranged in merely radial direction, but deviates therefrom. Thereby, for instance, a sealing in axial direction or with a predetermined angle is feasible. It goes without saying that also other sealings may be used, which comprise at least partially a sealing profile, which is arranged at the second bearing ring.

A further aspect of the present invention relates to a coupling element, as described above, for a bearing arrangement comprising a bearing and a bearing support.

Further advantages and preferred embodiments are defined in the depended claims, the drawings and the description. In the following the invention will be described in more detail with reference to embodiments illustrated in the drawings. Thereby, the embodiments are merely exemplary and should not define the scope of the application. This is solely defined by the appended claims.

BRIEF DESCRIPTION OF THE SEVERAL VIEWS OF THE DRAWINGS

It shows.

In the following same or functionally comparable components will be indicated with the same reference signs.

FIGS. 1 to 7 show sectional views through a bearing arrangement 100 comprising a bearing 1, which is axially and radially attached to a bearing support 2 via a coupling element 4. Thereby, the figures show different embodiments of the coupling element 4, but all embodiments comprise an outer bearing ring 6 and an inner bearing ring 8 between which rolling elements 10 are arranged. A bearing interior 12, which is arranged between the outer bearing ring 6 and the inner bearing ring 8, is sealed against the outside by a sealing element 16 at a side 14 facing away from the bearing support 2. For mounting the sealing element to the outer bearing ring 6 a groove 18 is formed at the outer bearing ring 6, with which the sealing element 16 engages. Radially inside the sealing element 16 further a sealing lip 20, with which the sealing element 16 sealingly bears against the inner bearing ring 8.

The outer bearing ring 6 comprises a groove 24 on a side 22 facing the bearing support 2, with which the coupling element 4 engages by means of a first nose-shaped protrusion 26. A second protrusion 28 is formed at the coupling element 4, wherein the second protrusion 28 extends radially outwards in the direction of the bearing support 2, wherein the coupling element 4 encompasses the bearing support 2 at least partially by means of the second protrusion 28. A recess 32 may be formed at the bearing support at the side 22 facing away from the bearing 1, engaging with the second protrusion 28. Recess 32 and radial protrusion 28 may be designed as discrete elements, which are distributed over the circumference, so that the coupling element 4 allows for a sound axial and radial fastening of the hearing 1 to the hearing support 2. Thereby, the discrete configuration of the second protrusion 28 particularly conduce to the radial fastening, whereas the bearing 1 is axially mounted to the bearing support 2 via engagement of the nose 26 with the groove 24. Additionally, an undercut 34 may be formed at the groove 24, wherein a complementarily formed configuration 36 at the nose 26 (see FIG. 2, 3, 6, 7) engages with the undercut 34. Thus, a sound axial fastening may be achieved. Furthermore, the coupling element 4 comprises an extension 30, which extends radially inwardly, wherein the extension 30 extends as far as the inner bearing ring 8, and wherein the extension 30 shuts the bearing interior 12 at least in a substantially sealing manner This radially inwardly extending extension 30 ensures for a sealing of the bearing interior 12, so that contaminations may not enter the bearing 1 and lubricant may not be discharged from the bearing 1.

Figure 1:
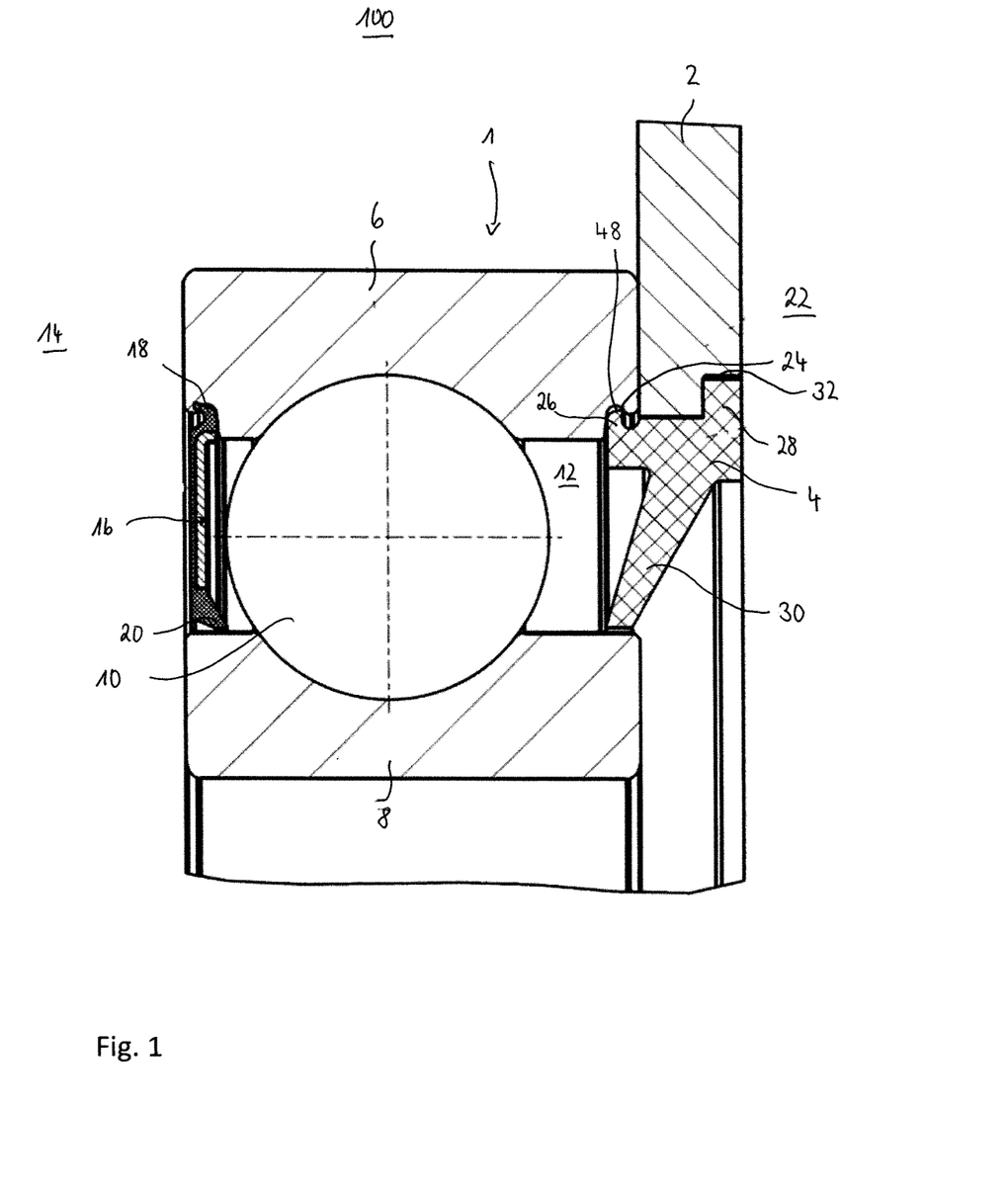
FIG. 1: a schematic illustration of a first preferred embodiment of the bearing arrangement according to the invention.

FIG. 1 shows a first preferred embodiment, wherein the coupling element 4 is designed as one-piece, preferably, made from a plastic material. When mounting of the bearing arrangement 100, the bearing 1 is merely arranged at the bearing support 2 and the coupling element 4 is fitted into place, wherein the coupling element 4 snaps into the groove 24 with its nose 26, and thereby, fastens the bearing 1 to the bearing support 2.

By means of the one-piece design of the coupling element 4, which is shown in FIG. 1, a particularly easy and quickly mounted fastening may be provided. A labor-intensive injection-molding of the bearing support 2 and an additional machining of the outer bearing ring 6 may be omitted, since the presented configuration of the coupling element 4 may use already existing grooves 24, which are usually used for the sealing elements of a standard bearing 1. In FIG. 1, the radial extension 30 may be formed as continuous ring element, whereas the protrusion 28 and the nose 26 are designed as discrete elements.

The embodiments of FIGS. 2 to 7, which will be described in the following, show coupling elements 4, which are not formed as one-piece, as shown in FIG. 1, but have a first coupling element portion 4-1 in form of a holding element and a second coupling element portion 4-2 in form of a sealing element.

Figure 2:
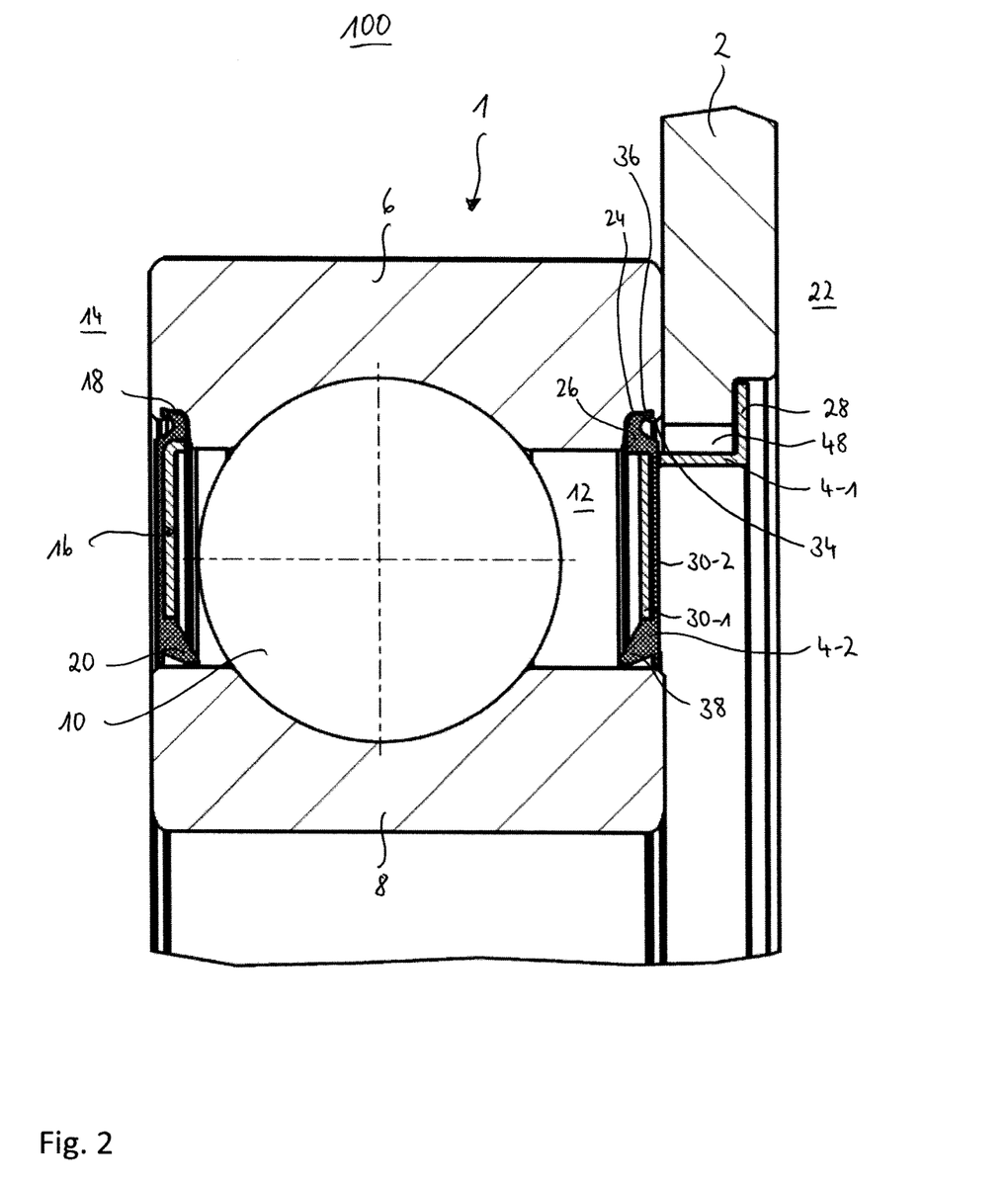
FIG. 2: a schematic illustration of a second preferred embodiment of the bearing arrangement according to the invention.
Figures 3, 3A:
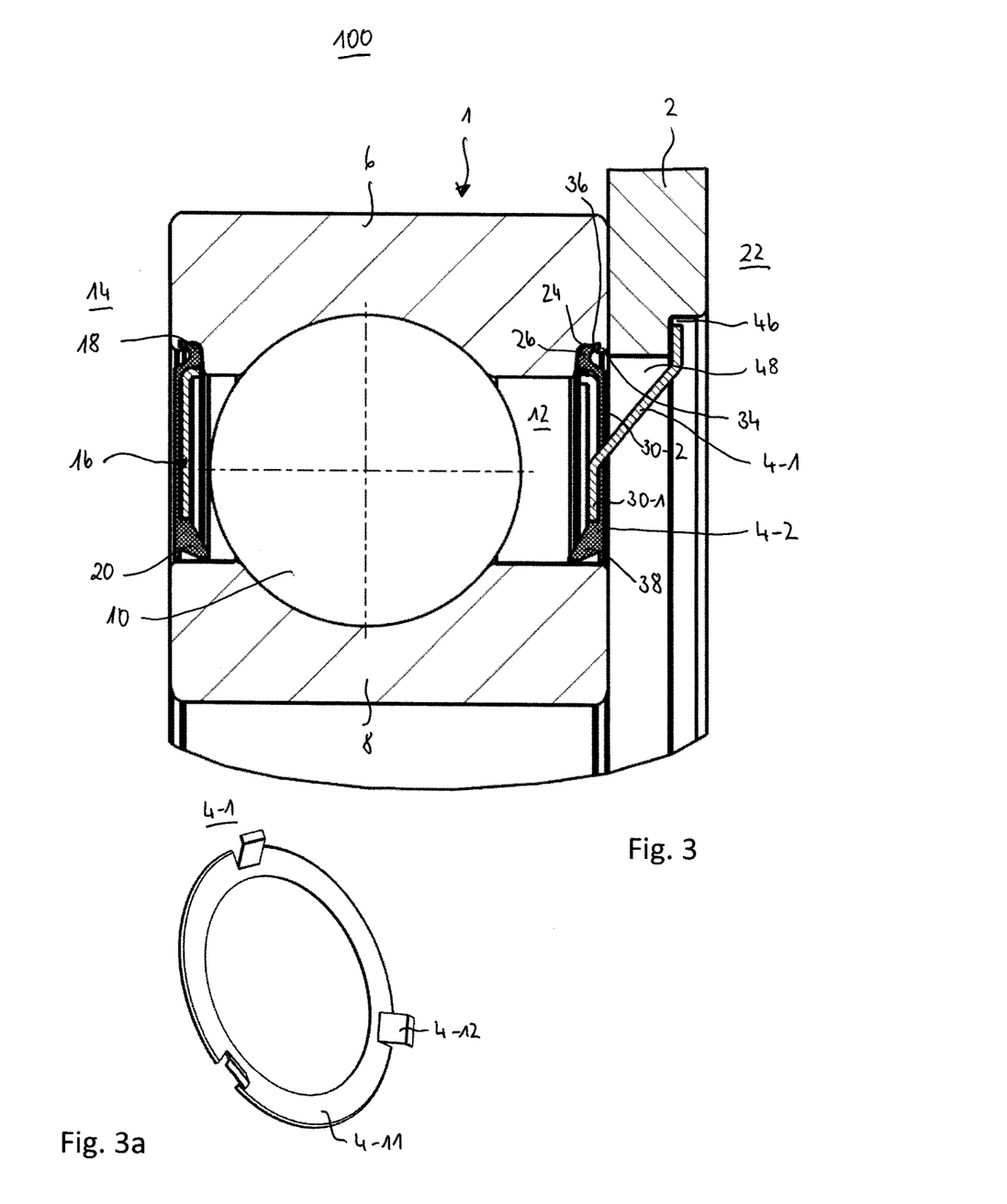
FIG. 3: a schematic illustration of a third preferred embodiment of the bearing arrangement according to the invention.
FIG. 3*a*: a perspective view of a holding element of the bearing arrangement according to the invention.

In the embodiments shown in FIGS. 2 and 3, the mounting of the coupling element 4 to the outer bearing ring 6 is performed by the sealing element 4-2, which comprises the nose 26 for this purpose. In the illustrated embodiments of FIGS. 2 and 3, for providing a sound coupling of the sealing nose 26 and the groove 24, the groove 24 has an undercut 34, into which an analogously formed hook 36 at the nose 26 may engage.

Furthermore, FIGS. 2 and 3 show, that the holding element 4-1 comprises the radially extending protrusion 28, which at least partially encompasses the bearing support 2. For providing a fastening between the sealing element 4-2 and the holding element 4-1, a radial extension 30-1 is formed at the holding element 4-1, which is encompassed by the radial extension 30-2 of the sealing element 4-2. An opening may be formed in the radial extension 30-1 of the holding element 4-1 resp. in the radial extension 30-2 of the sealing element 4-2, through which the radial extension 30-2 of the sealing element 4-2 resp. the radial extension 30-1 of the holding element 4-1 may pass. Alternatively, in the region of the radial extension 30-1, the holding element 4-1 may be injection-molded by a plastic material, so that the corresponding sealing element 4-2 is formed.

Additionally, the radial protrusions of the holding element 4-1 may be designed as discrete elements and the coupling between the bearing 1 and the bearing support 2 may be provided by snapping the coupling element 4 into the corresponding grooves and recesses 32.

FIG. 3 shows a particularly preferred embodiment, wherein the holding element 4-1 is formed in a membrane-spring manner, so that an easy snapping into place of the coupling element 4 is enabled, and thereby, easy coupling between the bearing support 2 and the bearing 1 is provided. The special shape of the holding element 4-1 is shown in FIG. 3a, which only shows the holding element 4-1. As can be seen in this figure, the holding element comprises a ring portion 4-11 and flexible tongues 4-12, formed from the ring portion 4-11, wherein the flexible tongues 4-12 are bended out from the level of the ring portion 4-11. The ring portion 4-11 therefore forms the radial extension 30-1 of the holding element 4-1, whereas the flexible tongues 4-12 provide the fastening to the bearing support 2.

Figure 4:
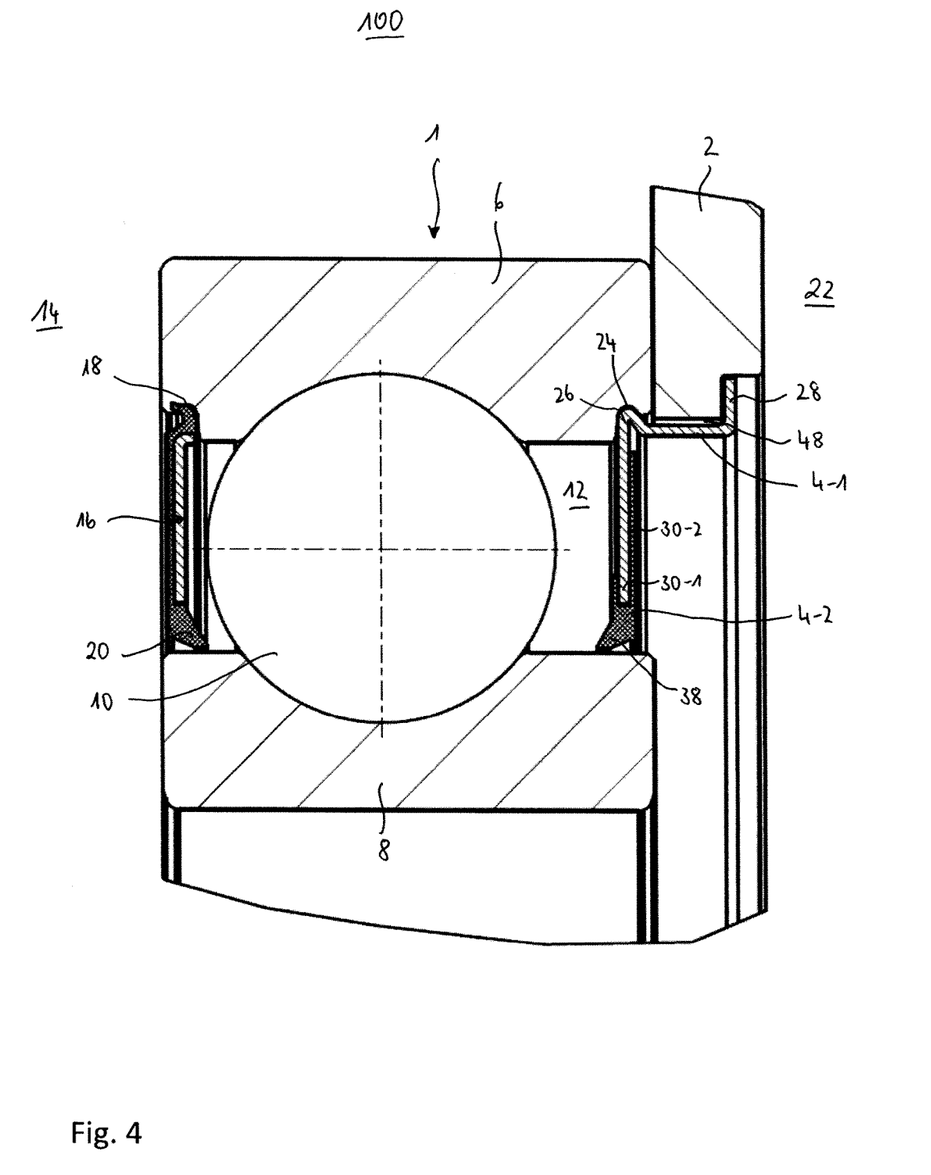
FIG. 4: a schematic illustration of a fourth preferred embodiment of the bearing arrangement according to the invention.

In the embodiments illustrated in FIGS. 4 to 7, the coupling between the groove 24 and the coupling element 4 is, in contrast to the embodiments of FIGS. 2 and 3, not provided by the sealing element 4-2, but by the holding element 4-1. Besides, the holding element 4-1 comprises a correspondingly formed nose 26, for engaging with the groove 24. In such an embodiment, the sealing element 4-2 may be formed, for example, as clip-on element, as shown in the embodiment of FIG. 4, wherein the clip-on element may be clipped onto the radial section 30-1. Alternatively, in this embodiment, the radial section 30-1 may be designed by injection-molding.

Analogously to the sealing element 16, FIGS. 2 to 7 show, that, radially inwards, the sealing element 4-2 comprises sealing lip 38, with which the sealing element 4-2 sealingly abuts against the inner bearing ring 8.

Figure 5:
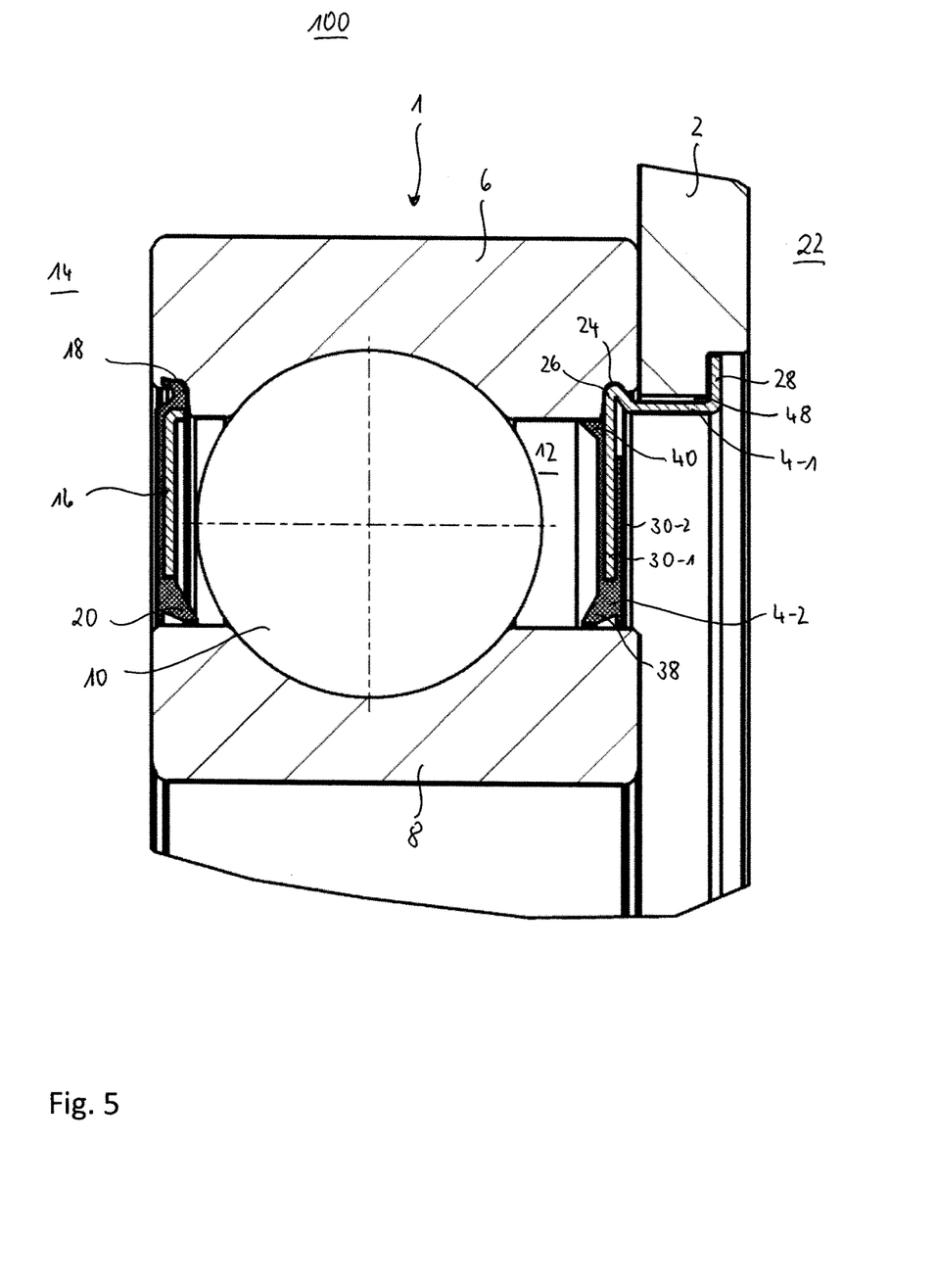
FIG. 5: a schematic illustration of a fifth preferred embodiment of the bearing arrangement according to the invention.
Figure 6:
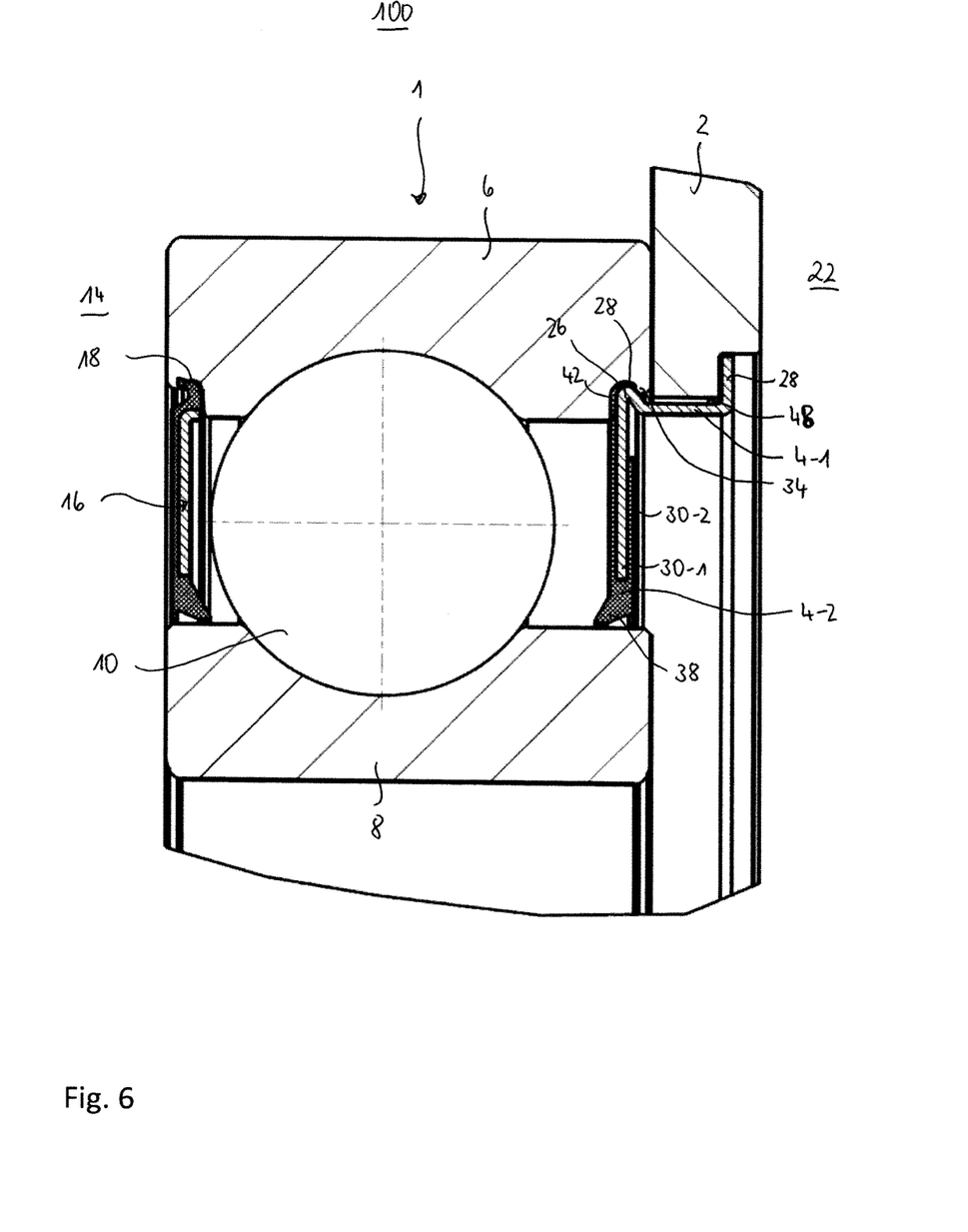
FIG. 6: a schematic illustration of a sixth preferred embodiment of the bearing arrangement according to the invention.

As illustrated in FIG. 5, for providing a sound sealing of the bearing interior 12, the sealing element 4-2 may not only bear against the inner bearing ring 8 by means of the formed sealing lip 38 in the direction of the inner bearing ring, but it is also possible, that a further sealing lip 40 is provided at the outer bearing ring 6. Thereby, the radial extension 30-1 of the holding element may be sealed in the groove 24, so that the bearing interior 12 is well sealed. In this embodiment, the sealing element 4-2 may also be clipped on or molded. It goes without saying that a second sealing lip 40 at the outer bearing ring 6 may also be provided in all other embodiments.

Instead of the sealing lip 40, as shown in FIG. 5, a sealing of the groove 24 and in particular of a gap 42 between the groove 24 and the nose 26 may also be performed by covering the radial extension 30-1 of the holding element 4-1 till the nose 26 with the material of the sealing element 4-2 at the bearing side, so that the gap 42 between the nose 26 and the bearing ring 6 is sealingly filled with the material of the sealing element 4-2. Thereby, the material of the sealing element 4-2 may even extend over the nose 26 and may engage there with undercut 34 of the groove 24.

Figure 7:
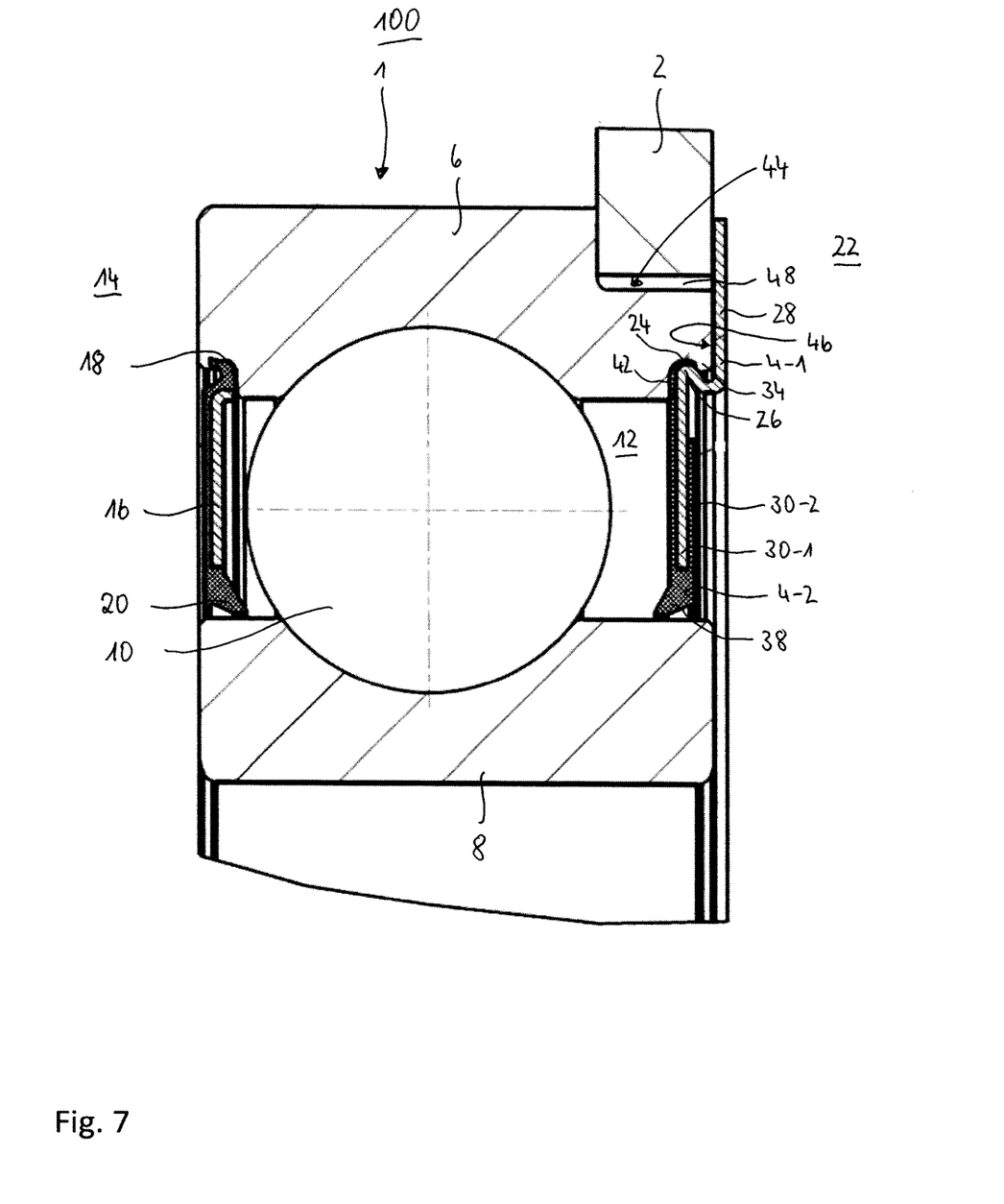
FIG. 7: a schematic illustration of a seventh preferred embodiment of the bearing arrangement according to the invention.

If there is axially only little space available, the bearing support 2 may also be received in a recess 44, which is formed at the outer bearing ring 6, as shown in the embodiment of FIG. 7. In this embodiment, the radial protrusion 28 is radially extended, so that it extends beyond the recess 44 along a face side 46 of the outer bearing ring 6. Thus, the bearing support 2 may be fitted between the radial protrusion 28 and the bearing ring 6, and may be fastened thereto.

Furthermore, FIGS. 1 to 7 show that the coupling element 4 is designed in such a way, that a radial clearance 48 is provided between the bearing 1 and the bearing support 2. This may be realised, for example, by a radial gap 48 between the first protrusion 26 and the groove 24, as shown in FIG. 1. Alternatively, such a gap 48 may remain between the holding element 4-1 and the bearing support 2, as shown in FIGS. 2 to 6. In case the bearing support 2 is received in a recess 44 at the outer bearing ring 6, as illustrated in FIG. 7, the recess 44 may radially be increased, for forming the gap 48 of the radial clearance. The radial gap 48 preferably comprises a value in a range of 0.01 to 1 mm, so that a selectively adjustable radial clearance between the outer ring 6 and the bearing support 2 may be realized. This radial clearance serves for the compensation of possible manufacturing tolerances when mounting the bearing arrangement 100 to an intended application. This radial clearance may also be provided in all other embodiments.

In the embodiments, illustrated in FIGS. 2 to 7, it is preferred, that the holding element 4-1 is made from a metal sheet, and the sealing element 4-2 is made from a plastic material, especially from an elastomer. Thereby, the metal sheet may be coated by a plastic material, or may be molded, as mentioned before, but it is also possible, that pre-fabricated plastic sealing elements 4-2 comprise pockets, which may receive the radial extension 30-1 of the holding element 4-1. For providing a sound connection between the plastic material of the sealing element 4-2 and the metal sheet of the holding element 4-1, recesses may be provided at the metal sheet, which may be infused by the plastic material. Furthermore is possible, that the radial protrusions 28 of the holding element is not designed circumferentially, but is merely formed at discrete locations. Preferably, the radially extending extension 30-1 of the holding element 4-1 is ring-shaped.

In summary, the described coupling element 4 allows for a standard bearing 1 to be mounted to a bearing support 2, wherein the grooves 18, 24, which are already existing, are not only used for sealing, but may also be used for the fastening. Furthermore, a sealed bearing may be provided preventing dirt and contaminations from entering into the bearing, and lubricant from leaking out of the bearing, uncontrollably. Since the coupling element 4 has a supporting function as well as a sealing function, the fastening may be significantly facilitated.

REFERENCE NUMBER LIST 100 bearing arrangement
1 bearing
2 bearing support
4 coupling element
6 outer bearing ring
8 inner bearing ring
10 rolling element
12 bearing interior
14 side facing away from the bearing support
16 sealing element
18 groove
20 sealing lip
22 bearing support facing side
24 groove
26 nose
28 radial protrusion
30 radial extension
32 recess
34 undercut at the groove
36 complementary formed configuration
38 sealing lip at the inner bearing ring
40 sealing lip at the outer bearing ring
42 sealed gap
44 recess in the outer bearing ring
46 face side of the outer ring
48 gap for radial clearance
4-1 holding element
4-2 sealing element
4-11 ring-part
4-12 flexible tongues

The invention claimed is:

1. A bearing arrangement comprising:
at least one bearing, and
a bearing support, wherein the bearing is coupled to the bearing support at an axial side, wherein the bearing provides first and second bearing rings, which define a bearing interior there between, wherein a first groove is formed at the first bearing ring's radial side facing the second bearing ring, and wherein a coupling element is arranged at the bearing's axial side facing the bearing support, the coupling element includes a first, nose-shaped, radial protrusion, which is in engagement with the first groove, and a second radial protrusion, which at least partially encompasses the bearing support at a side facing away from the bearing, so that the coupling element fastens the bearing to the bearing support, wherein the coupling element further comprises a radial, ring-shaped, extension, wherein the radial extension substantially extends in the direction of the second bearing ring, and wherein a sealing lip is arranged at the radial extension facing the second bearing ring.

2. The bearing arrangement according to claim 1, wherein the coupling element is designed in such a way that a radial clearance is provided between the bearing and the bearing support.

3. The bearing arrangement according to claim 1, wherein the first groove has an undercut and the first protrusion engages with the undercut and wherein the protrusion is a complementarily formed nose.

4. The bearing arrangement according to claim 1, wherein the bearing support circumferentially has at least one recess, and wherein the second protrusion engages with the at least one recess.

5. The bearing arrangement according to claim 1, wherein the bearing further comprises a second groove at a side facing away from the bearing support, wherein the second groove is axially spaced apart from the first groove, and accommodates a sealing element, which radially extends in direction of the second bearing ring, and wherein a profile of the sealing element functions to seal the second bearing ring.

6. A bearing arrangement comprising:
at least one bearing, and a bearing support, wherein the bearing is coupled to the bearing support at an axial side, wherein the bearing provides first and second bearing rings, which define a bearing interior there between, wherein a first groove is formed at the first bearing ring's radial side facing the second bearing ring, and wherein a coupling element is arranged at the bearing's axial side facing the bearing support, the coupling element includes a first, nose-shaped, radial protrusion, which is in engagement with the first groove, and a second radial protrusion, which at least partially encompasses the bearing support at a side facing away from the bearing, so that the coupling element fastens the bearing to the bearing support, wherein the second protrusion is designed as separate protrusion elements, and wherein the second protrusion is formed as spring element and/or as snapping element.

7. A bearing arrangement comprising:
at least one bearing, and a bearing support, wherein the bearing is coupled to the bearing support at an axial side, wherein the bearing provides first and second bearing rings, which define a bearing interior there between, wherein a first groove is formed at the first bearing ring's radial side facing the second bearing ring, and wherein a coupling element is arranged at the bearing's axial side facing the bearing support, the coupling element includes a first, nose-shaped, radial protrusion, which is in engagement with the first groove, and a second radial protrusion, which at least partially encompasses the bearing support at a side facing away from the bearing, so that the coupling element fastens the bearing to the bearing support, wherein the coupling element further comprises at least a first coupling element portion and a second coupling element portion, wherein the first coupling element portion has the second radial protrusion and is designed as holding element, which fastens the bearing to the bearing support, and wherein the second coupling element portion has a first radial extension and is designed as sealing element for sealing the bearing.

8. The bearing arrangement according to claim 7, wherein the sealing element extends from the first bearing ring to the second bearing ring in a sealing manner and at least at the radial extension, a sealing profile is formed at least at the side facing the second bearing ring.

9. The bearing arrangement according to claim 7, wherein the sealing element comprises the first protrusion, which is received in the first groove, and wherein the sealing element having the radial extension extends from the first groove in direction of the second bearing ring.

10. The bearing arrangement according to claim 7, wherein the holding element comprises the first protrusion, which is received in the first groove.

* * * * *